J. WOODBURN.
Spoke-Socket.
No. 56,681. Patented July 24, 1866.
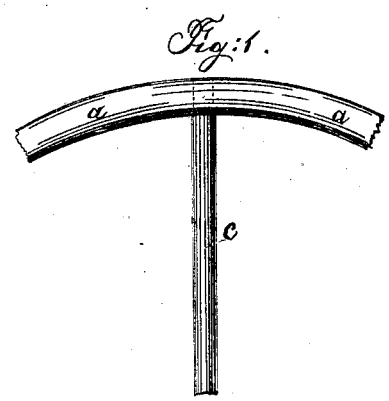
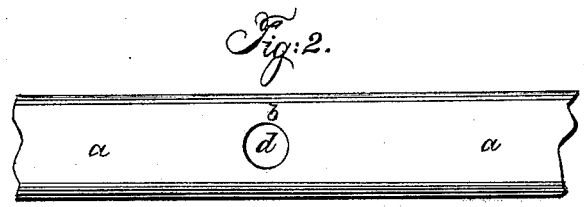
Witnesses,
Inventor,

UNITED STATES PATENT OFFICE.

JACOB WOODBURN, OF ST. LOUIS, MISSOURI, ASSIGNOR TO HIMSELF AND THOMAS SCOTT, OF SAME PLACE.

IMPROVEMENT IN CARRIAGE-WHEELS.

Specification forming part of Letters Patent No. 56,681, dated July 24, 1866.

*To all whom it may concern:*

Be it known that I, JACOB WOODBURN, of St. Louis, in the county of St. Louis and State of Missouri, have invented a new and useful Improvement in Spoke-Tenons for Carriage-Wheels, &c.; and I do hereby declare that the following is a full, clear, and exact description thereof, which will enable others skilled in the art to make and use the same, reference being had to the accompanying drawings, forming a part of this specification.

It is a well-known fact with carriage-manufacturers that much difficulty has been experienced in the use of the ordinary round tenon for wheel-spokes from the almost constant splitting of the rim of the wheel as the carriage is used, owing to the reason that the strain of the tenon in the rim was equally as great toward the outer edges of the wheel-rim as in the direction of its length. This splitting often causes the entire loss of the rim, and in order to prevent it it has been generally found necessary to strengthen the felly or rim of the wheel at or near each spoke by rivets, screws, or in any other similar manner.

To obviate these objections and defects in the use of round tenons for wheel-spokes is the object of the present invention, and is accomplished by forming the tenon of an oval or elliptical shape, with its largest axis in the proper direction upon the spoke, so that when driven into the rim of the wheel it shall be in the direction of its length, the mortise hole or socket in the wheel for which tenon is made of a round shape, or nearly so, whereby the wheel-rim can be set upon the spokes with great tightness and with strain upon the sides of the mortise-hole only in the direction of the length of the rim, and not across or upon the front and back edges thereof, thereby preventing in a great measure the flattening of the rim between the spokes and the bulging of the hole in front and back of tenon, often causing, when in use, the tenon to become loose and to rattle.

By the use of the oval-shaped tenon, as above described, I also obviate the necessity of inserting screws or rivets in the rim, as has heretofore been the case.

In accompanying plate of drawings my improvement is illustrated, Figure 1 being a side view of a wheel, showing one spoke; Fig. 2, a view of outer or top edge of same; Fig. 3, an enlarged view of the outer end of a spoke.

$a\ a$ in the drawings represent a portion of the ordinary rim of a wheel, made of any of the usual materials, in which, and passing entirely through the same, is made a round, or nearly so, mortise hole or socket, $b$; $c$, the spoke, made of the proper length for the wheel, and $d$ its tenon, by which it is fastened in the wheel-rim $a$. This tenon $d$ is made of an oval or elliptical shape, with its largest diameter of a little greater length than that of the mortise-hole of the wheel-rim, and in the proper direction upon the spoke that when driven into the wheel-rim it shall be in the direction of its length.

The spoke-tenon is driven into the wheel-rim in the usual manner, and by forming it of an oval or elliptical shape and with its largest diameter in the direction of the length of the wheel-rim, as described, it is not only tightly held within and to the rim, but in such a manner as not in the least degree to cause it to split or its sides to bulge, producing a loosening and rattling of the spoke as the carriage is used, as is evident without further description.

Having thus described my invention, I claim as new and desire to secure by Letters Patent—

An oval or elliptical shaped tenon for wheel-spokes, in combination with a round-shaped mortise-hole in the wheel-rim therefor, substantially as herein described, and for the purposes specified.

JACOB WOODBURN.

Witnesses:
 J. Q. CONNER,
 JAMES S. YOST.